(12) United States Patent
Dukes

(10) Patent No.: US 6,739,659 B2
(45) Date of Patent: May 25, 2004

(54) MOTORIZED REMOTE CONTROLLED RECLINING CHILD CAR SEAT

(76) Inventor: David N. Dukes, 1 Sandpiper Strand, Coronado, CA (US) 92118

( * ) Notice: Subject to any disclaimer, the term of this patent is extended or adjusted under 35 U.S.C. 154(b) by 0 days.

(21) Appl. No.: 10/074,295

(22) Filed: Feb. 11, 2002

(65) Prior Publication Data

US 2003/0151284 A1 Aug. 14, 2003

(51) Int. Cl.⁷ .................................................. A47D 1/10
(52) U.S. Cl. ........................... 297/256.13; 297/250.1; 297/256.14; 297/327; 297/330
(58) Field of Search ........................... 297/250.1, 256.1, 297/256.13, 256.14, 256.16, 327, 330

(56) References Cited

U.S. PATENT DOCUMENTS

| 4,386,803 A | * | 6/1983 | Gilderbloom |
| 4,545,613 A | * | 10/1985 | Martel et al. |
| 4,709,960 A | * | 12/1987 | Launes |
| 5,494,331 A | * | 2/1996 | Onishi et al. |
| 5,551,751 A | * | 9/1996 | Seclack et al. |
| 6,352,006 B1 | * | 3/2002 | Kurashita |

FOREIGN PATENT DOCUMENTS

| DE | 4204228 | * | 2/1992 |
| GB | 2202433 | * | 9/1988 |
| WO | WO 94/25306 | * | 11/1994 |

* cited by examiner

Primary Examiner—Laurie K. Cranmer
(74) Attorney, Agent, or Firm—Donald W. Meeker

(57) ABSTRACT

A motor and sprocket drive move a child safety seat between a sitting and reclining position on a base secured by a vehicle safety belt. A drive shaft and gear system, drive belt with pulley system, double action winch and cord system or other drive system positioned within an enclosed base move the sprocket reversibly. A remote control operable by the driver of the vehicle controls the seat motor. A pair of sprockets housed in the base interacts horizontally with a mating pair of arched tracking grooves in the seat to move the seat with no weight bearing on the sprockets. The electric motor may be battery powered or plugged into the cigarette lighter of the vehicle. The sprocket or a solenoid lock the seat in place.

8 Claims, 6 Drawing Sheets

MOTORIZED REMOTE CONTROLLED RECLINING CHILD CAR SEAT

BACKGROUND OF THE INVENTION

1. Field of the Invention

The present invention relates to child safety car seats and in particular to a child safety car seat that has a remote controled motorized reclining capability.

2. Description of the Prior Art

While riding in cars, children normally wish to remain upright in a seated position to look around or play. But children often fall asleep while riding. In the safety child car seats, now required by law, a child falling asleep in a sitting position usually winds up with his or her head bent over in an uncomfortable position with the child's neck contorted downward and sideways and the child's head often falls forward in a potentially choking position unless the seat is reclined.

Some prior art child car seats are capable of reclining to allow the child to be in a comfortable position while sleeping and still be protected in the child car safety seat. These reclining seats provide a variety of means for raising or lowering the seat. All of them require special attention to lower or raise the seat.

U.S. Pat. No. 4,205,877, issued Jun. 3, 1980 to Ettridge provides a children's reclining car seat operably with a mechanical lever arm located on the side of the chair in a position that would be very difficult to reach from the front seat of the vehicle to adjust the seat.

U.S. Pat. No. 6,318,799, issued Nov. 20, 2001 to Greger et al., shows an adjustable car seat that requires turning a knob to adjust the seat. While the knob is positioned in the front of the seat, which may be easy to access, it requires considerable turning to adjust the seat through a full range of motion, which would be very distracting to a person trying to drive and adjust the seat at the same time.

U.S. Pat. No. 5,890,762, issued Apr. 6, 1999 to Yoshida, presents a child seat for a vehicle capable of reclining to a desired angle with a chair portion having a pair of convex curved sliding surfaces on each side of the bottom of the seat and a base having a pair of mating concave curved sliding surfaces on each side of the top of the base. A lock-releasing lever controls pins positioned in openings to lock the seat in place relative to the base. The operation is something that should not be performed while driving.

U.S. Pat. No. 6,322,142, issued Nov. 27, 2001 to Yoshida et al., claims a reclining child car seat with an inclination indicator for adjusting the reclining angle. A convex seat bottom slides on a pair of raised concave tracks protruding from the top sides of the base. Pins through a high back support are inserted into a series of openings on the seat to secure it in place. This requires stopping the car and working on the seat directly to adjust the reclining angle.

U.S. Pat. No. 4,545,613, issued Oct. 8, 1985 to Martel et al., describes a car seat carrier with a rigid molded seat that pivots on a pair of supports elevated above a base. Spring loaded control knobs control the pivoting angle. Considerable effort and attention must be paid to the knobs to adjust the reclining angle of the seat.

Either the parent must stop the vehicle to lower or raise the child safety seat or risk getting into an accident to attempt to raise or lower the seat while driving. It is usually very difficult to adjust a child car seat located in the back seat of the car or adjacent seat of the vehicle from the driver's seat. To do so while driving is very dangerous.

A parent can see the child in the rear view mirror or looking to the side to determine if the child is falling asleep or waking up, thereby requiring an adjustment of the child safety seat.

What is needed is a remote control with a motorized means for raising and lowering the child safety seat back and forth between an upright seating position and a lowered reclining position for sleeping.

One U.S. Pat. No. 4,709,960, issued Dec. 1, 1987 to Launes describes a reclinable children's car seat having a motor and drive shaft with pinions and a curved rack of the moving seat riding on the drive shaft so that the weight of the seat and the child has a tendency to stop the turning of the drive shaft. All the moving parts are exposed so that a child is able to get fingers or blankets or toys stuck in the moving works of the seat. A manual override handle extends from one end of the drive shaft so that it would be rotating when the motor is in operation, presenting another hazard. While this invention makes it easy to adjust the angle of the seat, it presents many hazards to the child and has features which are not likely to function efficiently.

So, a truly safe child safety seat with all moving parts enclosed and a fully operational remote control and a motor drive system that rotates freely without undue weight bearing down it would be desirable. The present invention answers that need.

SUMMARY OF THE INVENTION

An object of the present invention is to provide a child car safety seat which can automatically be adjusted to any position back and forth between an upright sitting position and a reclining sleeping position by employing an electric motor with a gear system or pulley system or winch and cord system or other means for raising and lowering the seat to any desired angle between the fully upright position and the fully reclined position.

Another object of the present invention is to provide a remote control for automatically and remotely controlling the position of the child car safety seat to adjust it between an upright position and a reclined position.

A further object of the present invention is to provide a motorized reclining child safety seat with all of the moving parts safely housed in a molded plastic shell enclosure not accessible to the child to prevent injury to the child and clogging of the moving works by any blankets, clothing, or toys in the possession of the child.

Yet another object of the present invention is to provide a motorized child safety seat with the drive mechanism separate from the supporting weight-bearing arched track on which the chair reclines. Ball bearings or a low friction coating, such as Teflon enables easy movement of the seat in the base. A pair of horizontal sprockets enclosed in the base engage an arched groove in a vertical surface of the seat, or a double-action winch or windlass with a wrapped cord connected to pins on the seat move the seat to a desired inclination, wherein the driving sprockets, related gears and drive shafts or related pulleys and drive belts or alternate winches and cords do not support the weight of the seat to create an efficiently running system with no constriction of the motor functioning.

One more object of the present invention is to provide a child safety seat with a motor means which can run off of the car electrical system by plugging it into the cigarette lighter, by a rechargeable battery pack or other means.

A still further object of the present invention is to provide a means to lock the seat in a secure position either by the stationary sprockets in the arched groove of the seat or by a solenoid pin from the base engaged in one of a series of openings in the seat or other locking means.

An additional object of the present invention is to provide a child car safety seat which is attachable to the car seat by means of the car seat belts.

In brief, a child car safety seat has an upper seat portion which moves relative to the base of the seat in a secure arched track, preferably on roller bearings or fabricated of Teflon or other low friction surfaces, between an upright sitting position and a reclined sleeping position and any desired position inbetween.

Any type of motor may be used including an electric motor with a rechargeable battery pack and/or connected to the car's electrical system, preferably with a cigarette lighter plug.

In one embodiment, the motor turns a pair of sprockets by a drive shaft and gear system or by a belt system with pulleys other means to engage the sprocket teeth in an arched groove on the upper seat portion, the arched groove having spaced ridges and openings mating with the teeth of the sprocket to move the upper portion of the seat. The sprocket engaging the ends of the arched groove will stop the movement of the seat at desired limits of movement wherein the seat is either in the upright sitting position or reclined sleeping position. The sprocket teeth act as a locking means to secure the seat an a stationary position when the motor is off.

In an alternate embodiment, the motor turns a pair of double-action winches or windlasses with a high friction cord or belt wound around the winch or windlass connected to an upper pin and a lower pin on the seat. The winch or windlass and cord and pins on each side of the seat are enclosed within a walled portion of the seat bottom. Stops on the base engage the seat walls to stop the movement of the seat at desired limits of movement wherein the seat is either in the upright sitting position or reclined sleeping position. A solenoid protruding from the base, preferably out of the motor protrudes into one of a series of holes in the seat to lock the seat in place when the motor is off. When the motor is activated the solenoid retracts to permit free movement of the seat.

A hand-held or other remote control switch is operated by the driver or others in the car to automatically activate the motor and adjust the child car safety seat to the desired position for the comfort of the child.

The bottom portion of the child car safety seat houses the motor and sprockets and drive systems and is also provided with a pair of openings, one on each side of the back edge of the bottom portion to admit the car seat belt therethrough and secure the child car safety seat in the back seat of the car.

An advantage of the present invention is that the driver of a car carrying one or more young children in child car safety seats, which are required to be positioned on the back seat of the car, can observe the child or children in the rear view mirror and automatically control the motorized reclining mechanism of the child seat(s) with a remote control without having to stop the car or risk having an accident by turning around to adjust the child safety seat while driving.

Another advantage of the present invention is that it safely conceals all of the moving parts within the housing of the base and seat so that the child will never get anything stuck in the moving works of the motorized reclinable seat.

A further advantage of the present invention is that it provides an efficient non-weight bearing motor drive system to get optimum performance from the motor.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
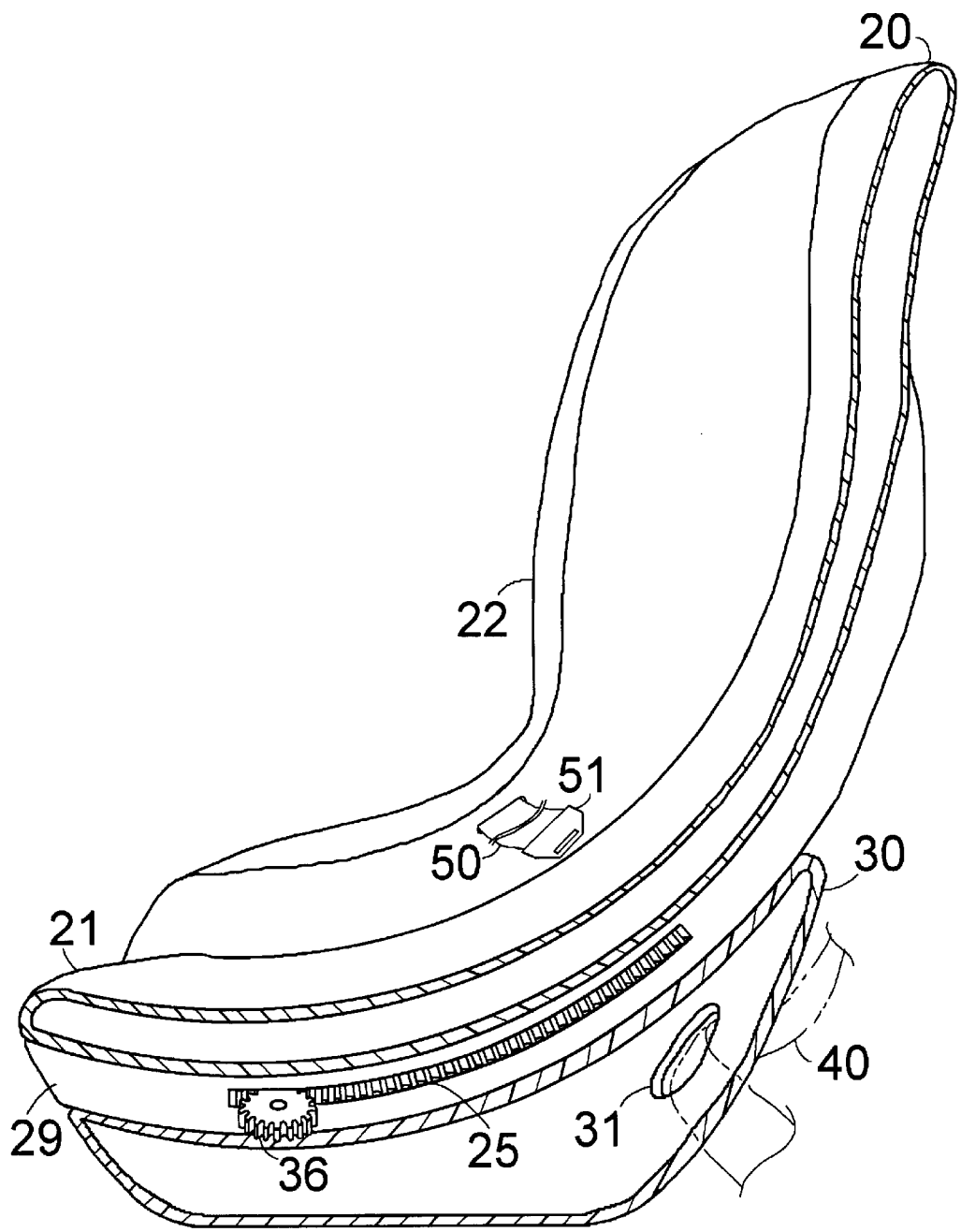
FIG. 1 is a cross-sectional view of the invention taken through 1—1 of FIG. 3 or 4 showing the arched groove of the seat and the engaging sprocket with the seat in the extreme upright position.

In FIGS. 1–4 a motorized reclining child safety seat for a vehicle comprises a seat 20 and a base 30 both formed of molded plastic with hollow interior enclosed spaces. The seat 20 has an upper portion with a supporting surface 21 and side panels 22 capable of receiving and supporting a child therein and a base 30 having a pair of openings 31 as a means for receiving a vehicle safety belt 40 secured thereto to secure the child safety seat to the vehicle seat. The seat is preferably provided with its own safety belt 50 securing means with secure latching means 51 and 52 to secure the child in the moving seat. This could be a harness or other type of system and is not affected by movement of the seat on the base.

Figure 2:
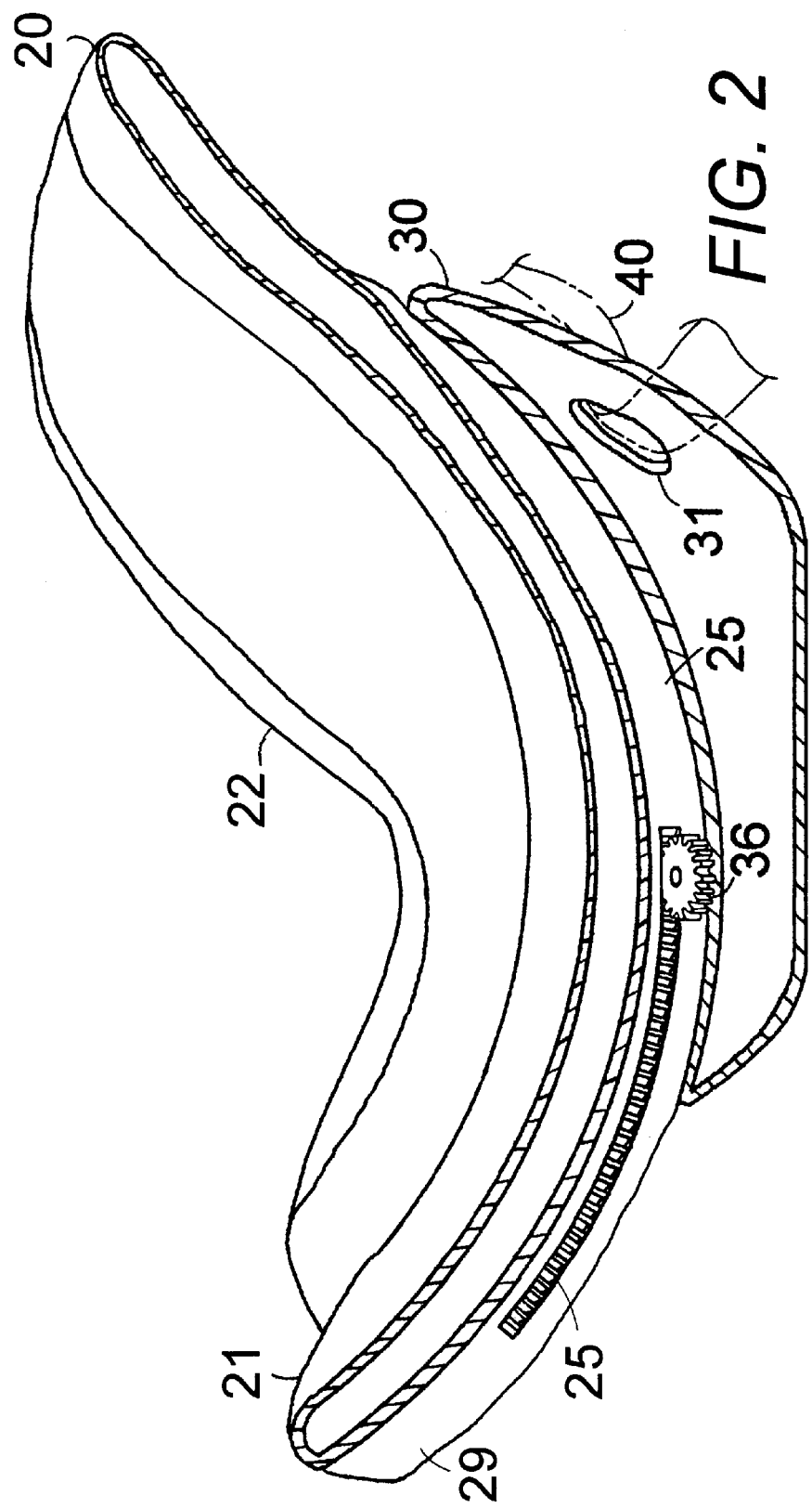
FIG. 2 is a cross-sectional view of the invention taken through 1—1 of FIG. 3 or 4 showing the arched groove of the seat and the engaging sprocket with the seat in the extreme reclined position.
Figure 3:
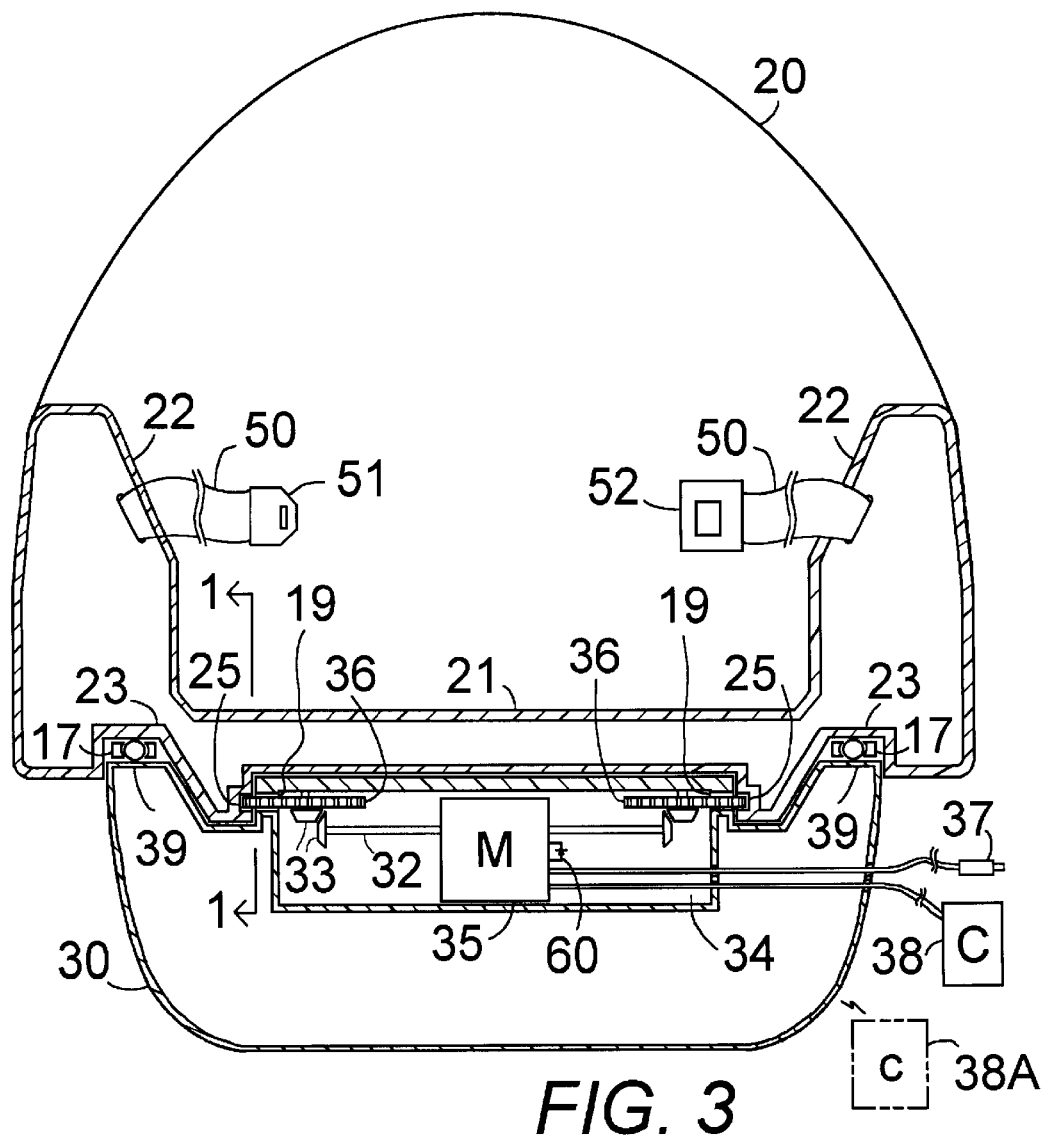
FIG. 3 is a cross-sectional view of the invention taken transversely through the center of the bottom portion of the seat showing the motor and gear and drive shaft systems engaging the sprockets, all completely enclosed within the base, with only the cigarette lighter plug and remote control extending out of the base.
Figure 4:
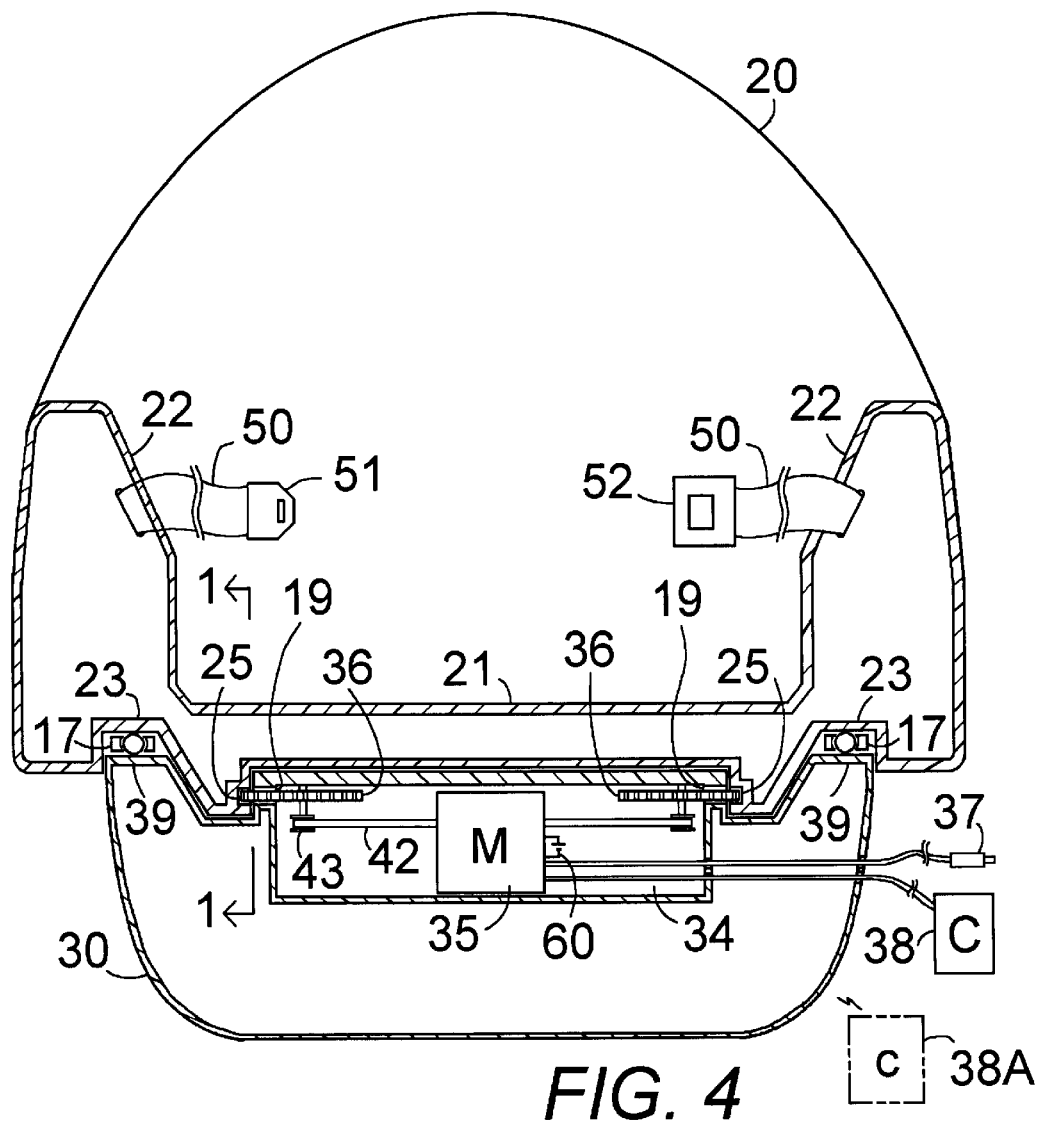
FIG. 4 is a cross-sectional view of the invention taken transversely through the center of the bottom portion of the seat showing the motor and belt and pulley systems engaging the sprockets, all completely enclosed within the base, with only the cigarette lighter plug and remote control extending out of the base.

The seat 20 further comprises a lower portion, consisting of a pair of downwardly protruding arched bottom portions 29, one on each of two sides, as seen in FIGS. 1 and 2. Each of the arched bottom portions has one half of an arched track means, such as an arched trough 23, as seen in FIGS. 3 and 4.

The upper portion of the base 30 comprises a mating arched track means along a top edge of each of two sides, such as a mating arched ridge 39, capable of slidably receiving and engaging the arched track means of the seat, the base supporting the full weight of the seat and its occupant. The mating arched track members allow the seat 20 to rest on and allow relative movement between the seat 20 and the base 30 enabling the seat to move through a full range of positions between a fully upright sitting position, as seen in FIG. 1, and a fully reclined sleeping position, as seen in FIG. 2. Preferably the full range of positions would be possible between the two extremes.

Figure 6:
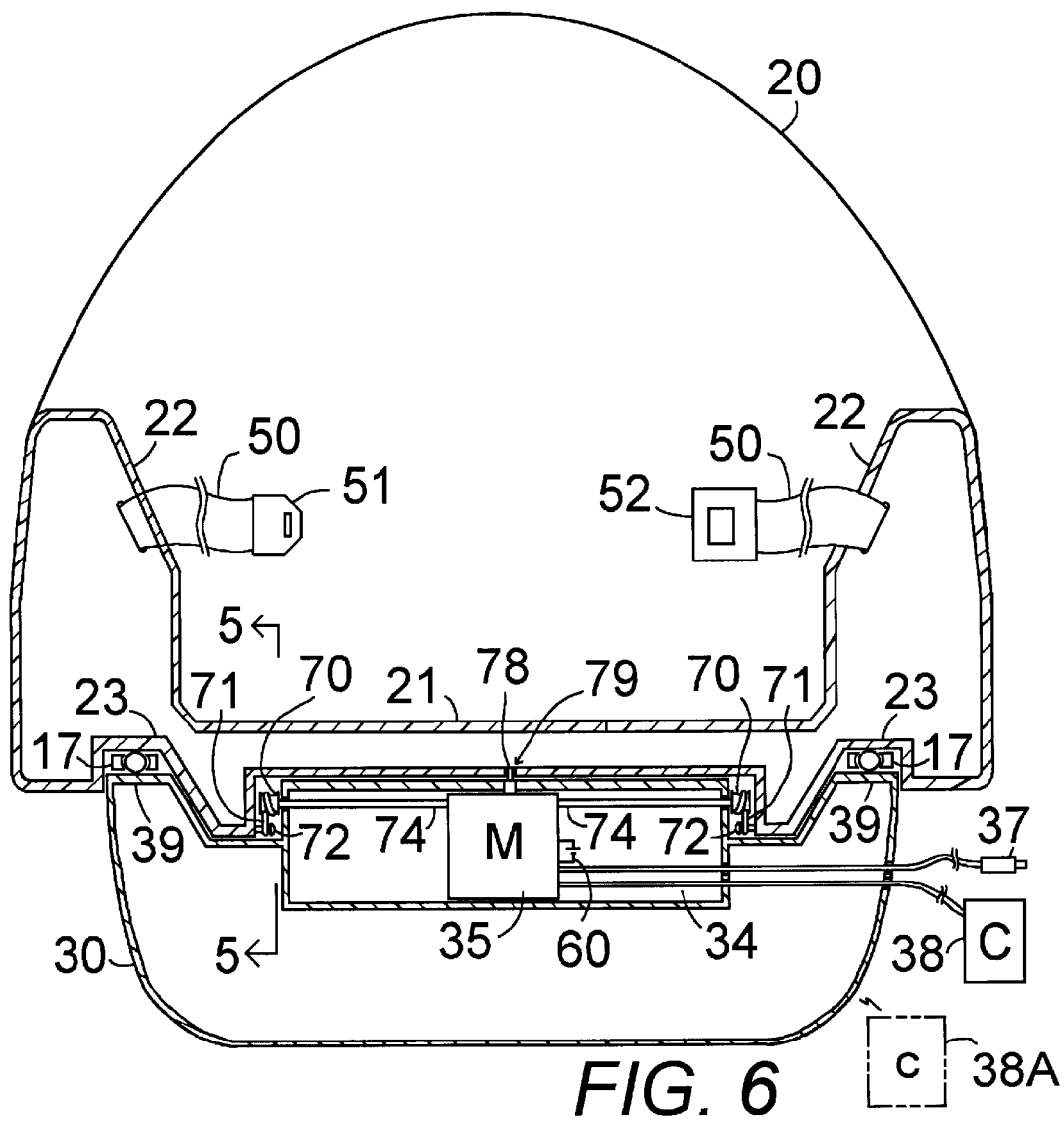
FIG. 6 is a cross-sectional view of the invention taken transversely through the center of the bottom portion of the seat showing the motor and connected double action winch or windlass and cord attached to the lower pin of the seat, with the motor enclosed within the base and the winch and cord and pins enclosed within an enclosed space between the seat and the base, with the cigarette lighter plug and remote control extending out of the base.

A low friction contact means between the seat and the base facilitates movement therebetween and require less power from the motor. In FIGS. 3, 4, and 6 the low friction means comprises a series of ball bearings 17 between the pair of downwardly protruding arched bottom portions 23 of the seat 20 and the mating pair of arched track means 39 on the base 30.

Alternately, the low friction contact means between the seat 20 and the base 30 comprises a coating of low friction surfacing material on the pair of downwardly protruding arched bottom portions 23 of the seat 20 and on the mating pair of arched track means 39 on the base 30.

The base 30 is provided with an enclosed space 34 having a horizontal slit 19 at each side of the enclosed space 30. The enclosed space 34 houses the motor 35 centrally positioned therein, and the reversible drive means comprises a pair of sprocket drive means 32 or 42 extending horizontally from the motor outwardly to two sides of the enclosed space and a pair of sprockets 36 interacting with the sprocket drive means and positioned horizontally with an edge of the sprocket protruding out of the enclosed space 34 through the narrow horizontal slit 19 in the enclosed space and the tracking means comprises an arched groove 25 in a vertical surface 29, as seen in FIG. 2, extending downwardly from the seat 20, the arched groove receiving and interacting with the edge of the sprocket protruding out of the enclosed space.

A motor 35 and reversible drive means is preferably housed in the base 30 within the enclosed chamber 34, although it could be housed in the seat 20 by enlarging the enclosed interior of the seat.

The reversible drive means comprises at least one sprocket 36 (preferably a pair of sprockets) and sprocket drive means connected to the motor 35, all housed within an enclosed space 34 in the base 30, the at least one sprocket 36 positioned horizontally. In FIG. 3, the sprocket drive means comprises a drive shaft 32 and gear system 33 linking the motor 35 with the sprocket 36 on each side of the motor 35. In FIG. 4, the sprocket drive means comprises a drive belt 42 and pulley system 43 linking the motor with the sprocket 36 on each side of the motor 35.

The sprockets 36 each have a series of evenly spaced teeth around the circumference of the sprocket positioned horizontally, which teeth protrude horizontally through narrow horizontal slits 19. A tracking means comprises a mating arched groove 25 positioned in a vertical surface 29 of the arched bottom portions of the seat 20. The grooves 25 each have a series of ridges and openings for receiving and mating with the teeth of the sprocket 36 so that rotation of the sprockets cause movement of the seat relative to the base. Because the sprockets 36 are horizontal and engage the mating arched grooves 25 positioned on the sides of vertical elements of the seat, there is no weight placed on the sprockets, so the motor and sprocket drive means runs smoothly without having to support the weight of the chair 20. The grooves 25 receive the teeth of the sprockets 36 so that no moving parts protrude. The sprockets 36 comprise a locking means for securing the seat 20 in a desired stationary position when the motor 35 is not in operation.

Figure 5:
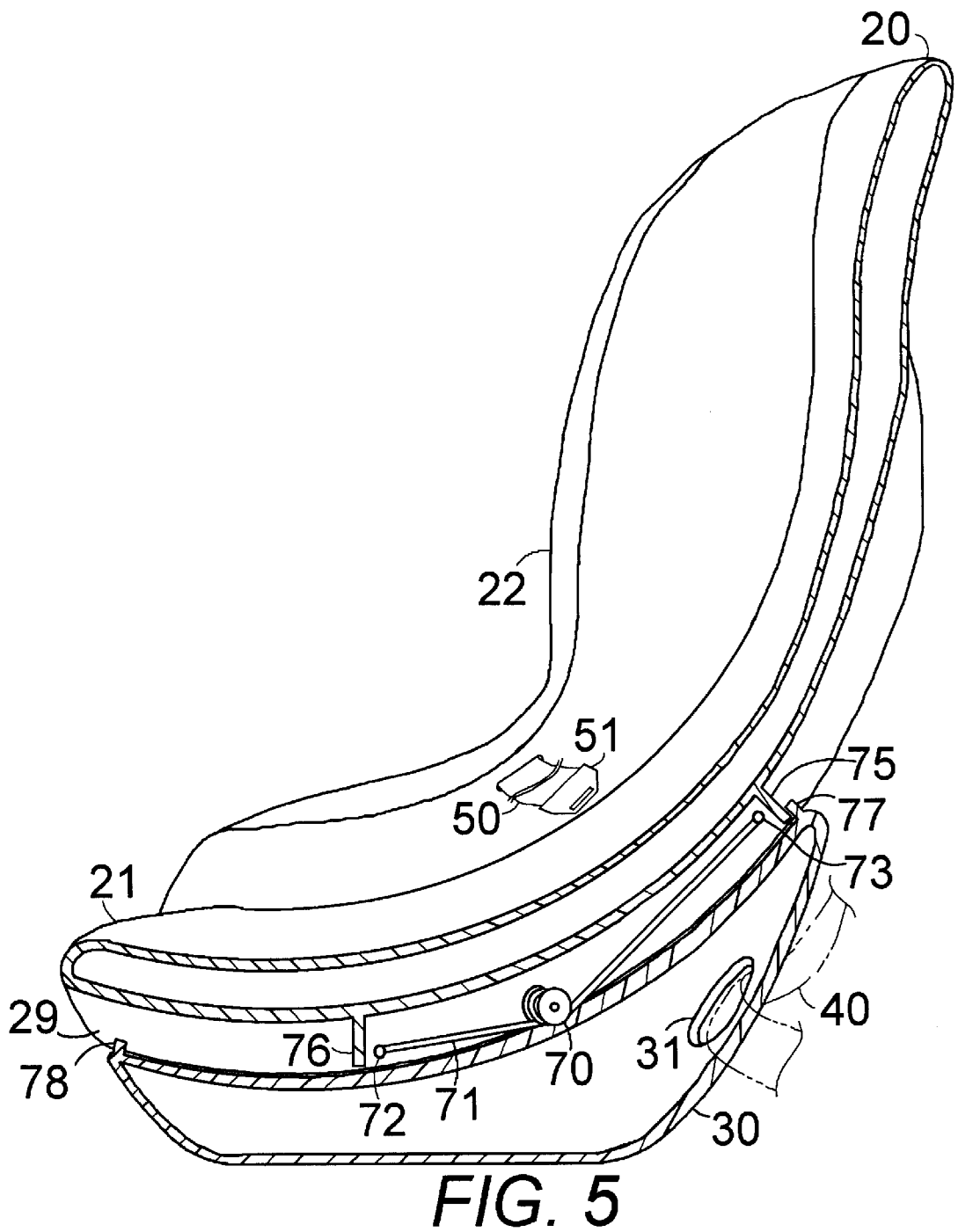
FIG. 5 is a cross-sectional view of the invention taken through 5—5 of FIG. 6 showing the upper and lower pins of the seat and the connecting cords to a double-action winch or windlass with the seat in the extreme upright position.

In FIGS. 5 and 6, an alternate embodiment of the reversible drive means comprises at least one, preferably two with one adjacent to each side of the seat, double-action winch 70 or windlass connected by a winch drive shaft 74 to the motor 35 and a high friction cord means 71, such as a rubberized cord or belt having two ends. The cord means 71 is wound at least once around the winch 70 and has one end of the cord means attached to a top pin 73 on the seat 20 spaced apart from the winch 70 in one direction and the other end of the cord means 71 attached to a bottom pin 72 on the seat 20 spaced apart from the winch in an opposite direction, so that having the motor 35 turn the winch in one direction pulls one of the pins toward the winch, moving the seat in one direction, and having the motor turn the winch in the opposite direction pulls the other one of the pins toward the winch moving the seat in an opposite direction to move the seat between the upright sitting position, as seen in FIG. 5 and the reclined sleeping position similar to the position of the seat in FIG. 2.

The base 30 is provided with an enclosed space 34 housing a single motor 35 and the enclosed space further comprises an opening at each side to admit an end of the winch drive shaft 74 therethrough. The seat 20 further comprises on each side a downwardly protruding vertical surface 29, each having two protruding perpendicular end walls 75 and 76 protruding therefrom extending from the seat to the base, thereby forming a second and third enclosed space on each side of the base, each housing a winch 70 attached to an end of the winch drive shaft 74 extending out from the motor 35, a cord means 71, and two pins 72 and 73 attached to the vertical surface 29 of the seat 20. A pair of stops 78 and 77 each protrude from the base 30 adjacent to a front and back end of the base, respectively, on each side of the base, each of the stops being capable of contacting one of the end walls 76 and 75, respectively, and stopping the movement of the seat to set the desired limits of movement.

In FIG. 6, the locking means for securing the seat in a desired stationary position comprises a solenoid 78 in the base 30, preferably attached to the motor 35, positioned opposite a series of holes 79 in the seat. The solenoid 78 being capable of receding during operation of the motor 35 to permit movement of the seat 20 and being capable of protruding into one of the series of holes 79 in the seat to lock the seat in place when the motor is not in operation.

A control means for the motor is preferably a remote control 38 operable from any location in the vehicle, including operation by the driver. The remote control 38 may be wired to the motor 35 or the remote control 38A may transmit wireless signals to control the motor 35.

The motor 35 may be powered by the vehicle electrical system through a cigarette lighter plug 37 or alternately be wired to the vehicle electrical system or powered by a battery 60 wired to the motor 35., In operation the driver of the vehicle can observe, via the rear view mirror, the child in the motorized child safety seat and operate the motor 35 with the remote control 37 to adjust the position of the child in the motorized child safety seat as needed without stopping the car or having to reach back to the safety seat to adjust it. Or others in the vehicle can operate the remote control. The child has no access to the moving parts contained within the base.

It is understood that the preceding description is given merely by way of illustration and not in limitation of the invention and that various modifications may be made thereto without departing from the spirit of the invention as claimed.

What is claimed is:

1. A motorized reclining child safety seat for a vehicle comprising:
   a seat adapted for supporting a child therein;
   a base adapted for supporting the seat and allowing relative motion therebetween;
   a motorized drive means for moving the seat within an enclosed housing, the motorized drive means interconnecting the seat and the base and adapted for moving the seat through a range of positions from an upright sitting position to a reclined sleeping position, wherein the seat and the base are formed as a mating pair of molded hollow shells and the motorized drive means is housed within the hollow shells, the motorized drive means comprising at least one motor and at least one reversible drive means connected to the motor, the reversible drive means comprising at least one sprocket and sprocket drive means housed in one of the hollow shells, the at least one sprocket having a series of spaced teeth around its perimeter, and the other one of the mating pair of hollow shells is provided with at least one groove having a series of ridges and openings receiving and mating with the teeth of the at least one sprocket so that rotation of the at least one sprocket causes movement of the seat relative to the base;
   a locking means for securing the seat in a desired stationary position, wherein the at least one sprocket is rigid when the at least one motor is off and the at least one sprocket comprises the locking means for securing the seat in a desired stationary position when the motor is not in operation;
   a remote control means for controlling the motor.

2. A motorized reclining child safety seat for a vehicle comprising:
   a seat adapted for supporting a child therein;
   a base adapted for supporting the seat and allowing relative motion therebetween;
   a motorized drive means for moving the seat within an enclosed housing, the motorized drive means interconnecting the seat and the base and adapted for moving the seat through a range of positions from an upright sitting position to a reclined sleeping position, wherein the seat and the base are formed as a mating pair of molded hollow shells and the motorized drive means is housed within the hollow shells, the motorized drive means comprising at least one motor and at least one reversible drive means connected to the motor, the reversible drive means comprising at least one sprocket and sprocket drive means housed in one of the hollow shells, the at least one sprocket having a series of spaced teeth around its perimeter, and the other one of the mating pair of hollow shells is provided with at least one groove having a series of ridges and openings receiving and mating with the teeth of the at least one sprocket so that rotation of the at least one sprocket causes movement of the seat relative to the base, the sprocket drive means comprising a drive shaft and gear system linking the at least one motor with the at least one sprocket;
   a locking means for securing the seat in a desired stationary position;
   a remote control means for the motor.

3. The motorized reclining child safety seat of claim 1 wherein the sprocket drive means comprises a drive belt and pulley system linking the at least one motor with the at least one sprocket.

4. A motorized reclining child safety seat for a vehicle comprising:
   a seat adapted for supporting a child therein;
   a base adapted for supporting the seat and allowing relative motion therebetween;
   a motorized drive means for moving the seat within an enclosed housing, the motorized drive means interconnecting the seat and the base and adapted for moving the seat through a range of positions from an upright sitting position to a reclined sleeping position, the motorized drive means comprising at least one motor and at least one reversible drive means connected to the motor, wherein the reversible drive means comprises at least one double-action winch connected by a winch drive shaft to the at least one motor and a high friction cord means having two ends, the cord means adapted for being wound at least once around the winch and having one end of the cord means attached to a pin on the seat spaced apart from the winch in one direction and the other end of the cord means attached to a pin on the seat spaced apart from the winch in an opposite direction, so that having the at least one motor turn the at least one winch in one direction pulls one of the pins toward the winch, moving the seat in one direction, and having the at least one motor turn the at least one winch in the opposite direction pulls the other one of the pins toward the winch moving the seat in an opposite direction;
   a locking means for securing the seat in a desired stationary position;
   a remote control means for the motor;
   wherein the seat and the base are formed as a mating pair of molded hollow shells and the motorized drive means is housed within the hollow shells.

5. The motorized reclining child safety seat of claim 4 wherein the locking means for securing the seat in a desired stationary position comprises a solenoid in the base positioned opposite a series of holes in the seat, the solenoid being adapted for receding during operation of the motor to permit movement of the seat and being adapted for protruding into one of the series of holes in the seat to lock the seat in place when the motor is not in operation.

6. The motorized reclining child safety seat of claim 1 wherein the remote control means for the at least one motor is a remote control wired to the at least one motor.

7. The motorized reclining child safety seat of claim 6 wherein the remote control means is a wireless remote control which transmits wireless signals to control the at least one motor.

8. The motorized reclining child safety seat of claim 1 further comprising a low friction contact means for reducing friction between the seat and base shells.

* * * * *